3,836,555
DIISOCYANATE-ORGANOMETALLIC CATALYST SOLUTIONS
Edmond G. Kolycheck, Lorain, Ohio, assignor to The B. F. Goodrich Company, New York, N.Y.
No Drawing. Filed Apr. 20, 1973, Ser. No. 353,127
Int. Cl. C08g 22/24
U.S. Cl. 252—431 N       6 Claims

ABSTRACT OF THE DISCLOSURE

A hindered phenolic phosphonate is used in a solution of triphenylbismuthine in an isocyanate or diisocyanate at an elevated temperature in order to prevent or reduce discoloration of the solution by catalyst degradation and to prevent or reduce subsequent discoloration of products obtained by reacting the isocyanate or diisocyanate solution with an active hydrogen containing compound or polymer. Use of another hindered phenol or phosphonate does not prevent such discoloration.

BACKGROUND OF THE INVENTION

The reaction of isocyanates and diisocyanates with compounds having active hydrogen atoms such as water, hydrazine, hydrogen sulfide, polyhydric alcohols, organopolyamines, carboxylic acids, and the like, is well known. Also suitable for reaction with isocyanates and diisocyanates are polymers having active hydrogen atoms, such as polyesters prepared by reacting polyhydric alcohols with polycarboxylic acids or epsilon caprolactones, and then mixed with chain extenders such as glycols and the like; polyester amides prepared by including amines in the preparation of polyesters; polyethers prepared by condensing an alkylene oxide with itself, other alkylene oxides, water, polyhdric alcohols and the like, and then mixed with chain extenders such as glycols and the like; polythioethers prepared by reacting alkylene oxides with thiodiglycol and the like; polyacetals prepared by reacting polyhydric alcohols with aldehydes; and the like.

The above reactions do not normally require a catalyst when an aromatic isocyanate or diisocyanate is used. However, the use of a non-aromatic isocyanate or diisocyanate may require a catalyst because of lower reactivity. An organometallic catalyst may be used, generally in extremely small concentrations which require that it be dissolved in a monomer. Since most organometallic compounds are water-sensitive, and isocyanates or diisocyanates contain no water, an isocyanate or diisocyanate is the monomer chosen most often as the catalyst vehicle. However, an isocyanate or diisocyanate catalyst solution may discolor because of catalyst degradation upon prolonged heating, and a discolored solution may produce a discolored reaction product which is esthetically undesirable. Therefore, a discoloration-free or minimally discolored solution of organometallic catalyst in an isocyanate or diisocyanate solution is desired.

SUMMARY OF THE INVENTION

A hindered phenolic phosphonate is used in a solution of triphenylbismuthine in a dicycloaliphatic diisocyanate at an elevated temperature in order to prevent or reduce discoloration of the solution by catalyst degradation and to prevent or reduce subsequent discoloration of reaction products.

DETAILED DESCRIPTION

The reaction of an aromatic isocyanate or diisocyanate with an active hydrogen-containing compound or polymer does not normally require a catalyst, but use of a non-aromatic isocyanate or diisocyanate may require a catalyst because of lower reactivity, as is known to those skilled in the art. An organometallic catalyst may be used, generally in an extremely small concentration which requires that it be dissolved in a monomer. The catalyst-monomer solution must remain discoloration-free or minimally discolored throughout a prolonged polymerization run to ensure a uniform product.

Water is detrimental to the stability of most organometallic compounds. Since active hydrogen-containing materials such as polyester-glycol mixtures, polyether-glycol mixtures, and the like generally contain small amounts of water, they are not appropriate catayst vehicles. An isocyanate or diisocyanate reacts readily with trace amounts of water to yield an amine and liberate carbon dioxide, and reacts further with the amine to form a disubstituted urea; therefore, there is no water to affect organometallic compound stability. However, catalyst solutions in isocyanates or diisocyanates become discolored by catalyst degradation upon prolonged heating, and these discolored solutions may produce discolored reaction products which are esthetically undesirable.

I have now found unexpectedly that while use of a hindered phenolic phosphonate eliminates or reduces discoloration of organometallic catalyst solutions in isocyanates or diisocyanates, neither a hindered phenol nor a phosphonate alone does so. The hindered phenolic phosphonate has the formula

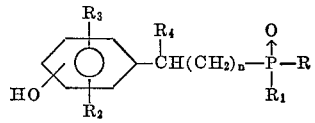

wherein R is selected from the group consisting of phenoxy or phenylthio; alkoxy or alkylthio having from 1 to 40 carbon atoms, such as methoxy, ethylthio, pentoxy, octyloxy, decylthio, octadecyloxy, docosoxy, tricosoxy and the like; alkylphenoxy or alkylphenylthio having from 1 to 40 carbon atoms, such as methylphenoxy, hexylphenoxy, tetradecylphenylthio, octadecylphenoxy, and the like; $R_1$ is selected from said group and phenyl or hydroxy; $R_2$ and $R_3$ are alkyl having from 1 to 18 carbon atoms, such as ethyl, tertiary butyl, heptyl, tridecyl, and the like; $R_4$ is selected from hydrogen and alkyl having from 1 to 8 carbon atoms, such as methyl, butyl and the like; and $n$ is 0, 1, 2 or 3. Preferably, R is selected from the group consisting of phenoxy or phenylthio; alkoxy or alkylthio having from 7 to 24 carbon atoms, such as octyloxy, decylthio, octadecyloxy, docosoxy and the like; alkylphenoxy or alkylphenylthio having from 7 to 24 carbon atoms, such as tetradecylphenylthio, octadecylphenoxy, and the like; $R_1$ is selected from said group and phenyl or hydroxy; $R_2$ and $R_3$ are alkyl having from 1 to 8 carbon atoms, such as ethyl, tertiary butyl, heptyl and the like, especially tertiary butyl; $R_4$ is selected from hydrogen and alkyl having from 1 to 8 carbon atoms, such as methyl, butyl and the like, especially hydrogen and methyl; and $n$ is 0 or 1.

The preferred compound having the above formula is oxy,oxy-di-n-octadecyl-3,5-di - tert-butyl-4-hydroxybenzyl phosphate. It is mixed at a concentration of from about 0.001% to about 25% by weight of isocyanate or diisocyanate with triphenylbismuthine catalyst at a concentration of from about 0.001% to about 50% by weight of isocyanate or diisocyanate to make a solution. More preferably, the oxy,oxy-di-n-octadecyl - 3,5 - di-tert-4-hydroxybenzyl phosphonate is mixed at a concentration of from about 0.001% to about 10% by weight of isocyanate or diisocyanate with triphenylbismuthine at a concentration of from about 5% to 25% by weight of isocyanate or diisocyanate, and this concentrated solution is metered into a reaction process as a separate process stream, or the oxy,oxy-di-n-octadecyl-3,5-di-tert-butyl-4-hydroxybenzyl phosphonate is mixed at a concentration of from about 0.001% to about 4% by weight of isocyanate or diisocyanate with triphenylbismuthine at a concentration of from about 0.005% to about 1.0% by weight of isocyanate or diisocyanate, and this solution is metered into a reaction process as the main isocyanate or diisocyanate process stream.

Dicycloaliphatic diisocyanates are used preferably in this invention and more preferably have the formula

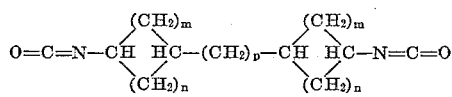

wherein $m$, $n$ and $p$ are 1, 2, 3 or 4. Examples of suitable compounds include 4,4'-dicyclopentylmethylene diisocyanate, 3,4'-dicyclopentylmethylene diisocyanate, 4,4'-dicyclohexylmethylene diisocyanate, and the like. More preferred is 4,4'-dicyclohexylmethylene diisocyanate.

The composition of matter of the present invention may be reacted with a variety of active hydrogen containing compounds, such as polycaprolactones, polyethers and the like, as is well known to those skilled in the art, to produce adhesives, packaging films, light stable injection molding and extrusion polymers useful in outdoor applications, and the like.

The following examples are intended to illustrate the present invention more fully.

Example I

To 4,4'-dicyclohexylmethylene diisocyanate at 80° C. was added 0.022% triphenylbismuthine catalyst by weight of the diisocyanate and 0.5% hindered phenol or hindered phenolic phosphonate by weight of the diisocyanate. Color effects were as shown in Table I.

Example II

To 4,4'-dicyclohexylmethylene diisocyanate at 80° C. was added 0.022% triphenylbismuthine catalyst by weight of the diisocyanate and 0.5% phosphonate or hindered phenolic phosphonate by weight of the diisocyanate. Color effects were as shown in Table II.

Example III

A solution of 0.01 part triphenylbismuthine in 34.51 parts 4,4'-dicyclohexylmethylene diisocyanate containing 0.5% oxy,oxy-di-n-octadecyl-3,5-di-tert-butyl-4-hydroxybenzyl phosphonate by weight of diisocyanate is reacted at a temperature of 175° C. with a mixture of 9.40 parts 1,4-butanediol and 54.48 parts of a 2000 molecular weight poly(epsilon)caprolactone to produce a solid polymer useful in outdoor applications where light stability is required. Said polymer produced without oxy,oxy-di-n-octadecyl - 3,5-di-tert-butyl-4-hydroxybenzyl phosphonate dissolved in the diisocyanate has substantially higher color.

I claim:

1. A solution of triphenylbismuthine and a hindered phenolic phosphonate having the formula

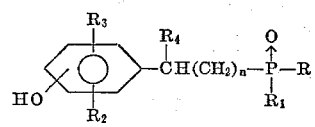

wherein R is selected from the group consisting of phenoxy, phenylthio, alkoxy having from 7 to 24 carbon atoms, alkylthio having from 7 to 24 carbon atoms, alkylphenoxy having from 7 to 24 carbon atoms, and alkylphenylthio having from 7 to 24 carbon atoms, $R_1$ is selected from the group consisting of said R, hydroxy and phenyl, $R_2$ and $R_3$ are alkyl having from 1 to 8 carbon atoms, $R_4$ is selected from the group consisting of hydrogen and alkyl having from 1 to 8 carbon atoms, and $n$ is 0 or 1, in a dicycloalkylenealkylene diisocyanate, wherein said triphenylbismuthine is at a concentration of from about 0.001% to about 50.0% by weight of diisocyanate, and said hindered phenolic phosphonate is at a concentration of from about 0.001% to about 25% by weight of diisocyanate.

2. A composition of matter of Claim 1 wherein said dicycloalkylenealkylene diisocyanate has the formula

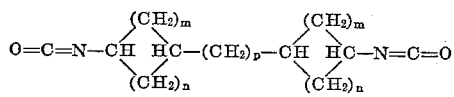

and $m$, $n$ and $p$ are 1, 2, 3 or 4.

3. A composition of matter of Claim 2 wherein triphenylbismuthine is at a concentration of from about 5% to about 25% by weight of diisocyanate, and said hindered phenolic phosphonate is oxy-oxy-di-n-octadecyl-3,5-di-tert-

TABLE I

| Sample No. | Hindered phenol or hindered phenolic phosphonate | Initial color | Color after 24 hours at 80° C. | Color after 96 hours at 80° C. | Color after 168 hours at 80° C |
|---|---|---|---|---|---|
| 1 | None (control) | Water white | Water white | Yellow | Dark yellow. |
| 2 | Tetrakis[methylene-3(3',5'-di-tert-butyl-4'-hydroxyphenyl)propionate]methane. | do | do | do | Do. |
| 3 | 2,6-di-tert-butyl-para-cresol | do | do | Light yellow | Light yellow. |
| 4 | Oxy, oxy-di-n-octadecyl-3,5-di-tert-butyl-4-hydroxybenzyl phosphonate. | do | do | Water white | Water white. |
| 5 | 1,1,3-tris(5'-tert-butyl-4'-hydroxy-2'-methylphenyl)butane. | Light yellow | Light yellow | Yellow | Dark yellow. |
| 6 | 1,3,5-trimethyl-2,4,6-tris[(3',5'-di-t-butyl-4'-hydroxy)benzyl]benzene. | Water white | Yellow | do | Do. |
| 7 | 2,2',2''-tris[3(3,5-di-tert-butyl-4-hydroxyphenyl)propionoyloxy]ethyl isocyanurate. | do | Water white | do | Do. |

Note.—Color scale darkens progressively from water white to very light yellow, light yellow, yellow, medium yellow and dark yellow.

TABLE II

| Sample No. | Phosphonate or hindered phenolic phosphonate | Initial color | Color after 24 hours at 80° C. | Color after 48 hours at 80° C. | Color after 72 hours at 80° C. | Color after 144 hours at 80° C. |
|---|---|---|---|---|---|---|
| 1 | None (control) | Water white | Light yellow | Yellow | Yellow | Dark yellow. |
| 2 | Oxy,oxy-di-n-octadecyl-3,5-di-tert-butyl-4-hydroxybenzyl phosphonate. | do | Water white | Very light yellow | Light yellow | Yellow. |
| 3 | Diethyl benzyl phosphonate | do | Light yellow | Yellow | Medium yellow | Dark yellow. |

Note.—Color scale darkens progressively from water white to very light yellow, light yellow, yellow, medium yellow and dark yellow.

butyl-4-hydroxybenzyl phosphonate at a concentration of from about 0.001% to about 10% by weight of diisocyanate.

4. A composition of matter of Claim 2 wherein triphenylbismuthine is at a concentration of from about 0.005% to about 1.0% by weight of diisocyanate, and said hindered phenolic phosphonate is oxy,oxy-di-n-octadecyl-3,5-di-tert-butyl-4-hydroxybenzyl phosphonate at a concentration of from about 0.001% to about 4.0% by weight of diisocyanate.

5. A composition of matter of Claim 3 wherein said dicycloalkylenealkylene diisocyanate is 4,4'-dicyclohexylmethylene diisocyanate.

6. A composition of matter of Claim 4 wherein said dicycloalkylenealkylene diisocyanate is 4,4'-dicyclohexylmethylene diisocyanate.

References Cited
UNITED STATES PATENTS

| | | | |
|---|---|---|---|
| 3,235,518 | 2/1966 | Hostettler et al. | 260—77.5 AB X |
| 3,280,049 | 10/1966 | Hyre et al. | 260—77.5 AB X |

PATRICK P. GARVIN, Primary Examiner

U.S. Cl. X.R.

252—431 P; 260—77.5 AB